(12) United States Patent
Nabuurs

(10) Patent No.: US 6,264,269 B1
(45) Date of Patent: Jul. 24, 2001

(54) OPEN ROOF CONSTRUCTION FOR A VEHICLE, AS WELL AS A VEHICLE COMPRISING AN OPEN ROOF CONSTRUCTION

(75) Inventor: Martinus Wilhelmus Maria Nabuurs, Overloon (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/291,726

(22) Filed: Apr. 14, 1999

(30) Foreign Application Priority Data

Apr. 16, 1998 (NL) .................................................. 1008900

(51) Int. Cl.[7] .................................................. B60J 7/043
(52) U.S. Cl. .................. 296/216.06; 296/216.02
(58) Field of Search .................. 296/216.02, 216.03, 296/216.06–216.09, 218

(56) References Cited

U.S. PATENT DOCUMENTS 4,466,656 * 8/1984 Igel .................................. 296/216.02

FOREIGN PATENT DOCUMENTS

| 247182 | * 7/1987 | (DE) | ................................ 296/216.06 |
| 2 491 841 | 4/1982 | (FR) . | |
| 2 044 686 | 10/1980 | (GB) . | |

* cited by examiner

*Primary Examiner*—Dennis H. Pedder
(74) *Attorney, Agent, or Firm*—Westman, Champlin & Kelly, P.A.

(57) ABSTRACT

An open roof construction for a vehicle having an opening in its fixed roof comprises a frame for being mounted in the opening in the fixed roof, and a rigid, transparent panel for selectively closing or at least partially releasing the opening in the fixed roof. An adjuster is provided between the frame and the panel for adjusting the panel between the closed position and the open position. The frame is provided with rearward protrusions at the rear, laterally of a central part thereof. The panel extends as far as the protrusions at the rear. This makes it possible to use an extra large roof opening and a large panel, whilst maintaining an interior unit on the fixed roof of the vehicle.

9 Claims, 2 Drawing Sheets

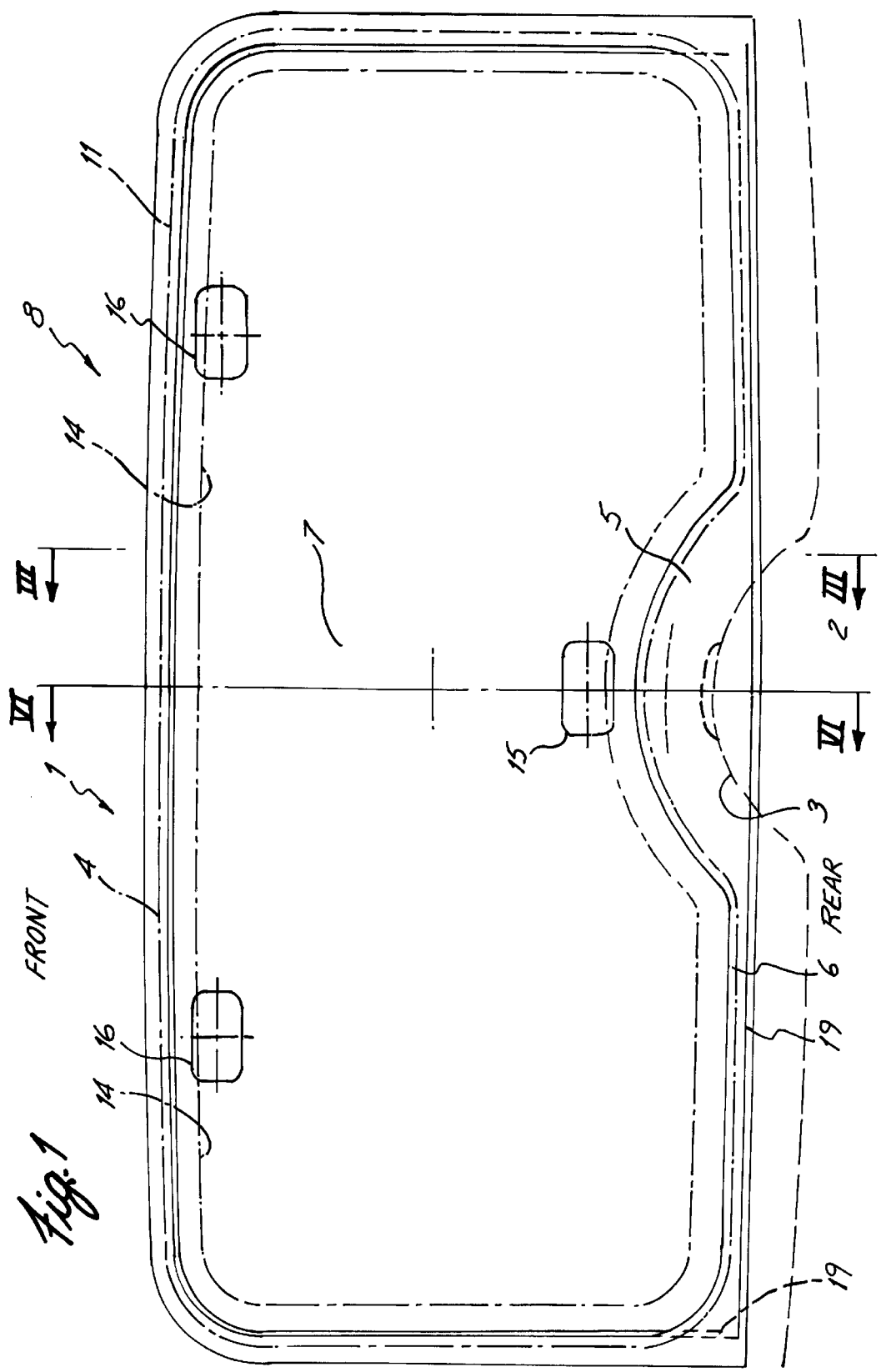

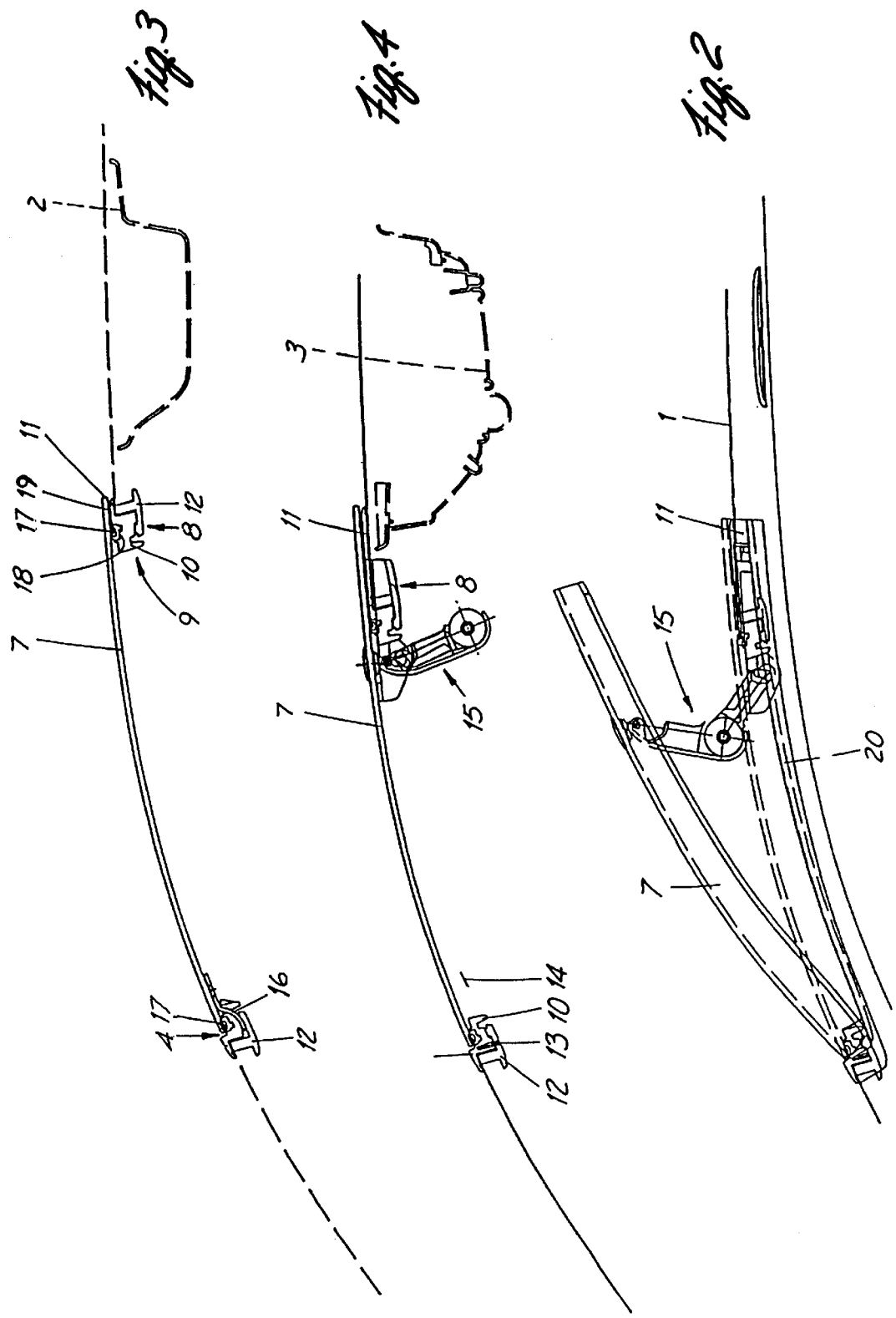

US 6,264,269 B1

OPEN ROOF CONSTRUCTION FOR A VEHICLE, AS WELL AS A VEHICLE COMPRISING AN OPEN ROOF CONSTRUCTION

BACKGROUND OF THE INVENTION

1. Field of the Invention

The invention relates to an open roof construction in accordance with the preamble of claim 1.

2. Description of the Related Art

Open roof constructions of this type are known in various versions. If such open roof constructions are manufactured for the after-market, the construction of the vehicle roof must be taken into account. In particular in the case of passenger cars, an interior unit comprising interior lighting, for example, and possibly control elements for said interior lighting or other electrical facilities is often centrally provided in the roof lining thereof. If said interior unit is maintained, the space which is available for an open roof construction in rearward direction is limited, so that the maximum daylight opening of the open roof construction is limited as well. Nevertheless, there is a continued demand for ever larger daylight openings and for the associated panels.

SUMMARY OF THE INVENTION

The object of the present invention is to provide an open roof construction of the type referred to in the preamble, wherein the above-described problem is eliminated in an efficient manner.

In order to accomplish that object, the open roof construction according to the invention is characterized in that the frame is provided with rearward protrusions at the rear, laterally of a central part thereof, whilst the panel extends as far as said protrusions at the rear.

The presence of said rearward protrusions on the frame and on the roof opening, which is adapted thereto, makes it possible to further enlarge the daylight opening of the open roof construction, without there being a need to remove or move the interior unit of the vehicle, since the central part of the frame is not extended in rearward direction, and a recess is formed in the frame and in the roof opening, as it were, in which the interior unit can be accommodated.

The panel likewise extends as far as the protrusions in rearward direction, whilst the rear edge of the panel preferably extends rectilinearly. Especially if the panel is made of a tinted transparent material or of a non-transparent material, the deviating daylight opening is hidden from view in the closed position of the panel, and the open roof construction has a large, substantially rectangular panel, which enhances the outward appearance of the vehicle.

In case the frame is arranged for being mounted in the opening in the fixed roof from above, and if, to that end, the frame is provided with an upper frame part comprising an inner part, which fits the roof opening, and a substantially flat flange, which adjoins said part in outward direction and which is adapted for abutment on the fixed roof surrounding the roof opening, it is preferred, according to the invention, to have the rear edge of the flange extending rectilinearly at the location of the central part of the rear side of the frame.

In case the panel shape is different from that of the daylight opening of the frame, it will be advantageous if, in its closed position, the front side of the panel abuts on the inner frame and is positioned inwardly of the flat flange, whilst the panel extends to above the flat flange on its rear side.

In this embodiment, the open roof construction is given a so-called "wedge look" with a rising line, seen from the side, which is in keeping with many vehicle designs. Furthermore, this aspects results in an extra large panel, which can terminate at its rear level with the rear edge of the flat flange of the frame.

A smooth transition between the front edge and the rear edge of the frame is obtained when the inner frame slopes upwards in a rearward direction with respect to the flat flange at the side edges, whilst the frame is preferably fitted with a cover rim at its side edges, which cover rim covers the side edge of the panel and which slopes upwards in rearward direction.

An optimum sealing between the frame and the panel is achieved when the seal is located as closely to the daylight opening or to the adjusting means as possible. In order to prevent water from collecting between the panel and the flat flange of the frame present thereunder, the invention proposes to provide a main seal on the inner part of the frame, on which the panel abuts in the closed position thereof, whilst an auxiliary seal is placed on the flange at the rear of the frame, on which flange the panel also abuts in its closed position.

The invention furthermore relates to a vehicle which is fitted with the open roof construction as described above.

The invention will be explained in more detail hereafter with reference to the drawings, which schematically illustrate an embodiment of the invention.

BRIEF DESCRIPTION OF THE DRAWINGS

FIG. 1 is a schematic plan view of a vehicle roof provided with an opening and an open roof construction according to the invention which is present therein.

FIG. 2 is a side view of the vehicle roof and the open roof construction according to FIG. 1, wherein the panel of the open roof construction is shown in an open position.

FIGS. 3 and 4 are sectional views along lines III—III and IV—IV, respectively, in FIG. 1.

DESCRIPTION OF THE PREFERRED EMBODIMENT

The drawing shows a part of a fixed roof 1 of a vehicle, in particular a passenger car. Some kind of cross beam 2 is provided on the inner side of said fixed roof 1, with a forwardly projecting interior unit 3 present in the central portion thereof. Said interior unit may for example contain interior lighting and any control buttons for said interior lighting, or also control buttons for other electrical facilities.

As is shown most clearly in FIG. 1, a roof opening 4 having a special shape is recessed in fixed roof 1, in that roof opening 4 has been enlarged in rearward direction beyond the front edge of interior unit 3, except for a central part 5, as a result of which said central part 5 forms some kind of indent, or as a result of which the lateral parts of the rear edge of the roof opening form protrusions 6 with respect to the central part, seen in longitudinal direction. This shape of the roof opening 4 makes it possible to enlarge the roof opening in a rearward direction without there being a need to remove or move interior unit 3.

The open roof construction as shown in the drawings is of the so-called pop-up type, which is provided with an 30 essentially rigid, preferably at least partially transparent panel 7, for example of glass or plastic material, which is adjustable between a closed position, in which it closes opening 4 in fixed roof 1, and an open position, in which it has been pivoted about a pivot near the panel front to an upwardly and rearwardly sloping ventilating position (see FIG. 2). The open roof construction according to the invention may also be of another type, for example a spoiler roof or the like. The panel 7 shown in the drawing is slightly curved, both about a horizontal longitudinal axis and about a horizontal transverse axis.

The open roof construction according to the invention is provided with a frame 8 of the type which can be mounted in roof opening 4 from above. To that end, frame 8 possesses an upper frame part 9 comprising an inner part 10, which fits roof opening 4, and a flat flange 11 extending outwardly thereof, which is adapted for abutment on fixed roof 1. Frame 8 furthermore comprises a lower frame part 12, which can be fixed to upper frame part 9 with fixing means 13, whereby it clamps down on the edge of fixed roof 1 surrounding roof opening 4. The inner part 10 of the upper frame part 9 defines the daylight opening 14 of the open roof construction, which is preferred to be as large as possible, both in an absolute sense and in relative sense with respect to roof opening 4.

In order to obtain the largest possible daylight opening 14, frame 8 is provided with protrusions 6 as well, laterally of a central part 5. As appears in particular from FIGS. 1 and 4, the rear edge of flange 11 at the rear end of frame 8 extends rectilinearly at the location of central part 5, so that flange 11 becomes wider there and the rear edge of flange 11 continues to extend at least approximately under the rear edge of panel 7, seen in the closed position of panel 7.

Adjusting means 15, which may consist of means which are known per se, and which will not be explained in more detail herein, is provided for adjusting panel 7 between the closed position and the open position. The illustrated adjusting means 15 is mounted in the center of the rear edge of frame 8, inwardly of the daylight opening. Preferably, the adjusting means 15 are fixed to the inner part 10 of the frame. The adjusting means make it possible to set the panel 7 to several positions. The panel is hinged to the frame at its front side by means of two sliding hinges 16 which are known per se, which also make it possible to remove the panel in a simple manner after the adjusting means 16 have been disconnected.

The sealing between panel 7 and frame 8 in the closed position of panel 7 is effected by a circumferentially extending sealing section 17, which is secured in a groove 18 in the upper side of the inner part 10 of upper frame part 9. In the closed position of panel 7, said panel abuts under pre-tension against the rubber-elastic sealing section 17 with its bottom side. In order to prevent water from collecting between panel 7 and flange 11 at the location of central part 5, a light auxiliary seal 19 is provided on flange 11 at the rear of frame 8, beside sealing section 17, which functions as the main seal. Said auxiliary seal provides a seal at the circumference of panel 7, in the rear side area, and it prevents water penetrating between flange 11 and panel 7. In this case, an auxiliary seal 19 on flange 11 and a main seal on the inner part 10 of frame 8 are used in order to shift the seal, and the associated sealing forces, as far inwardly and as closely to the adjusting means 15 as possible, in order to minimize the bending forces in the material of panel 7.

As is clearly shown in FIGS. 3 and 4, panel 7 abuts on the inner part 10 of frame 8 near its front, whilst it extends with its rear beyond the inner part 10, to above flange 11 of upper frame part 9 of frame 8. Accordingly, inner part 10 of upper frame part 9 is higher at the rear than at the front, and in order to adapt to this difference in height, inner part 10 gradually slopes upwards at the side edges of frame 8. Thus, a gradual transition is achieved, which, in addition, is in keeping with the currently popular wedge look of passenger cars. In order to hide the side edge of sloping panel 7 from view, a cover rim 20, which also slopes upwards towards the rear in a wedge-like manner, is formed on flange 11 at both side edges of frame 8.

The features of the invention make it possible to achieve a large roof opening 4 and thus a large daylight opening 14, despite the presence of an interior unit 3 in the interior of the vehicle. By having panel 7 extend over frame 8 at the rear, an extra large panel 7 can be used, the appearance of which is appreciated. Due to the generally dark tint of the transparent panel, the underlying frame is hardly visible, if at all, when the panel is closed, whilst the wedgelike slope of the panel from the front towards the rear accords with the wedge shape of many car models.

The invention is not limited to the embodiment described above and shown in the drawing, which can be varied in several ways within the scope of the invention. Thus, it would be possible to provide the adjusting means at the side edges rather than centrally in the frame, seen in transverse direction, and to use double adjusting means. Furthermore, the seals between the panel and the frame may also be formed on the panel.

I claim:

1. An open root construction for a vehicle having an opening in its fixed roof, the opening comprising a front edge coupled to a pair of longitudinal sides couple to respective rearward edges disposed on opposite sides and behind a central part, said open root construction comprising:

a frame adapted to be mounted in the opening in the fixed roof;

a rigid panel for selectively closing or at least partially releasing the opening in the fixed roof; and wherein said frame is provided with rearward protrusions at the rear, laterally of the control part, while said panel extends as far as said protrusions at the rear.

2. The open roof construction according to claim 1, wherein:

the frame is arranged for being mounted in the opening in the fixed roof from above;

the frame is provided with an upper frame part comprising an inner part which fits the roof opening, and a substantially flat flange which adjoins said inner part in outward direction and which is adapted for abutment on the fixed roof surrounding the roof opening; and the flange includes a rear edge that extends rectilinearly at the location of the central part of the rear of the frame.

3. The open roof construction according to claim 2, wherein the panel abuts with its front on the inner part of the frame in its closed position and wherein said panel is disposed above the rear edge of the flat flange.

4. The open roof construction according to claim 3, wherein the inner part of the frame slopes upwards in rearward direction with respect to the flat flange at side edges, while the frame is fitted with a cover rim at its side edges, which cover rim covers at least one side edge of the panel and which slopes upwards in rearward direction.

5. The open roof construction according to claim 3, wherein a main seal is provided on the inner part of the frame on which the panel abuts in the closed position.

6. The open roof construction according to claim 1, wherein:

the panel is pivotally connected to the frame near its front side;

the panel can be pivoted upwards at its rear side; and an adjusting means is provided on the inner part of the frame at the location of the central part of the rear side of the frame.

7. The open roof construction according to claim 2, wherein the frame comprises a lower frame part which extends around the inner part of the upper frame part and which can be fixed to the upper frame part while clamping down the vehicle roof therebetween.

8. An open roof construction for a vehicle having an opening in its fixed roof, said open roof construction comprising:

a frame adapted to be mounted in the opening in the fixed roof, said frame comprising an inner part which fits the roof opening, and a substantially flat flange, which adjoins said inner part in an outward direction and which is adapted for abutment on the fixed roof; and a rigid panel for selectively closing or at least partially releasing the opening in the fixed roof, said panel abutting on the inner part of the frame at a front in its closed position, wherein an even upper surface of said panel is position no higher than the flat flange at a front portion thereof and wherein said even upper surface extends above the flat flange at a rear.

9. A vehicle comprising a fixed roof and an opening therein, the opening comprising a front edge coupled to a pair of longitudinal sides coupled to respective rearward edges disposed on opposite sides and behind a central part, which is positioned in front or an interior unit on the lower side of the fixed roof, said vehicle being provided with an open roof construction comprising:

a frame mounted in the opening in the fixed roof;

a rigid panel for selectively closing or at least partially releasing the opening in the fixed roof; and said roof opening and said frame being provided with rearward protrusions at a rear location, except for a central part, as far as which the roof opening and the frame extend to a point behind said interior unit, while said panel extends above said protrusions at its rear edge.

* * * * *

UNITED STATES PATENT AND TRADEMARK OFFICE
CERTIFICATE OF CORRECTION

PATENT NO. : 6,264,269 B1  
DATED : July 24, 2001  
INVENTOR(S) : Nabuurs

Page 1 of 1

It is certified that error appears in the above-identified patent and that said Letters Patent is hereby corrected as shown below:

Column 4,
Line 26, replace "root" with -- roof --.
Line 28, replace "couple" with -- coupled --.
Line 30, replace "root" with -- roof --.
Line 37, replace "control" with -- central --.

Column 6,
Line 1, replace "position" with -- positioned --.

Signed and Sealed this

Thirtieth Day of April, 2002

Attest:

JAMES E. ROGAN
Director of the United States Patent and Trademark Office

*Attesting Officer*